(12) United States Patent
Diwane et al.

(10) Patent No.: US 9,986,509 B1
(45) Date of Patent: May 29, 2018

(54) ADVANCE REMOTE FAILURE NOTIFICATION (ARFN)

(71) Applicant: Cisco Technology, Inc., San Jose, CA (US)

(72) Inventors: Shivaji P. Diwane, Pleasanton, CA (US); Sundara Paal Rani Thirumalaiappan, Sunnyvale, CA (US); Yogapriya Gunasekaran, San Jose, CA (US); Vimal Aiyappath Narain, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/493,872

(22) Filed: Apr. 21, 2017

(51) Int. Cl.
| | |
|---|---|
| *H04W 24/00* | (2009.01) |
| *H04W 52/02* | (2009.01) |
| *H04W 4/12* | (2009.01) |
| *H04W 60/06* | (2009.01) |
| *H04W 60/00* | (2009.01) |
| *G06F 1/30* | (2006.01) |

(52) U.S. Cl.
CPC .......... *H04W 52/0296* (2013.01); *G06F 1/30* (2013.01); *H04W 4/12* (2013.01); *H04W 60/00* (2013.01); *H04W 60/06* (2013.01)

(58) Field of Classification Search
None
See application file for complete search history.

(56) References Cited

U.S. PATENT DOCUMENTS

| | | | | |
|---|---|---|---|---|
| 6,215,997 B1* | 4/2001 | Han | ........................ | H04M 3/10 455/423 |
| 7,957,297 B2* | 6/2011 | Dumov | ............... | H04L 43/0817 370/242 |
| 8,063,775 B2* | 11/2011 | Reed | ...................... | G06Q 50/06 340/3.1 |
| 8,248,203 B2* | 8/2012 | Hanwright | .............. | G06F 3/147 340/3.44 |
| 8,599,008 B2* | 12/2013 | Watson | ............... | H04L 12/2825 340/10.2 |
| 8,868,065 B2* | 10/2014 | Chang | ................... | H04W 52/02 455/423 |

(Continued)

FOREIGN PATENT DOCUMENTS

| | | | |
|---|---|---|---|
| CN | 105203889 A | 12/2015 | |
| CN | 105282779 A | 1/2016 | |

OTHER PUBLICATIONS

"Release Notes for IoT Field Network Director, Release 3.1.x", http://www.cisco.com/c/en/us/td/docs/routers/connectedgrid/iot_fnd/release_notes/3_1/rn-iot-fnd-3-1.html, 22 pages, Sep. 23, 2016, Cisco.

*Primary Examiner* — Tuan A Tran
(74) *Attorney, Agent, or Firm* — Parker Ibrahim & Berg LLP; James M. Behmke; Stephen D. LeBarron

(57) ABSTRACT

In one embodiment, circuitry on a device is configured to detect a power failure of the device, inform a cellular modem of the device of the power failure, and supply capacitive reserve power to the cellular modem in response to the power failure. The cellular modem of the device may then send, using the capacitive reserve power, a cellular detach message into a cellular network, where the detach message has an indication that causes a receiving device to send a notification of the power failure to a configured endpoint device.

20 Claims, 7 Drawing Sheets

(56) References Cited

U.S. PATENT DOCUMENTS

| | | | | |
|---|---|---|---|---|
| 8,891,525 B2* | 11/2014 | Addy | ............... | H04M 11/04 |
| | | | | 370/216 |
| 9,041,544 B2 | 5/2015 | Bagasra | | |
| 9,418,543 B1* | 8/2016 | Ross | ............... | G08C 17/02 |
| 9,424,149 B2 | 8/2016 | Knight | | |
| 9,756,675 B2* | 9/2017 | Lee | ............... | H04W 76/027 |
| 2009/0312667 A1* | 12/2009 | Utsunomiya | ........ | A61D 17/008 |
| | | | | 600/549 |
| 2015/0100166 A1* | 4/2015 | Baynes | ............... | F24F 11/0009 |
| | | | | 700/278 |
| 2017/0219234 A1* | 8/2017 | Bhide | ............... | F24F 11/006 |
| 2017/0256153 A1* | 9/2017 | Klein | ............... | G05B 15/00 |

\* cited by examiner

US 9,986,509 B1

ADVANCE REMOTE FAILURE NOTIFICATION (ARFN)

TECHNICAL FIELD

The present disclosure relates generally to computer networks, and, more particularly, to advance remote failure notification (ARFN), e.g., for power failure notification for cellular devices.

BACKGROUND

Typical Internet of Things (IoT) deployments often have multiple routers deployed across a geographic area. Network (or National) Operations Centers (NOCs) may then monitor all of the routers from a centralized place. If the remote router goes down and does not reconnect back to the NOC, customers often have to send technicians to the location of the down router (e.g., a "truck roll") in order to check and hopefully resolve the issue. Often, however, (e.g., 25% of the time), the reason for connectivity loss is simply a power outage. Since every site visit (truck roll) is associated with a cost (e.g., paying a technician per hour), this means that those associated costs are often (e.g., 25% of the time) an unnecessary loss of money.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
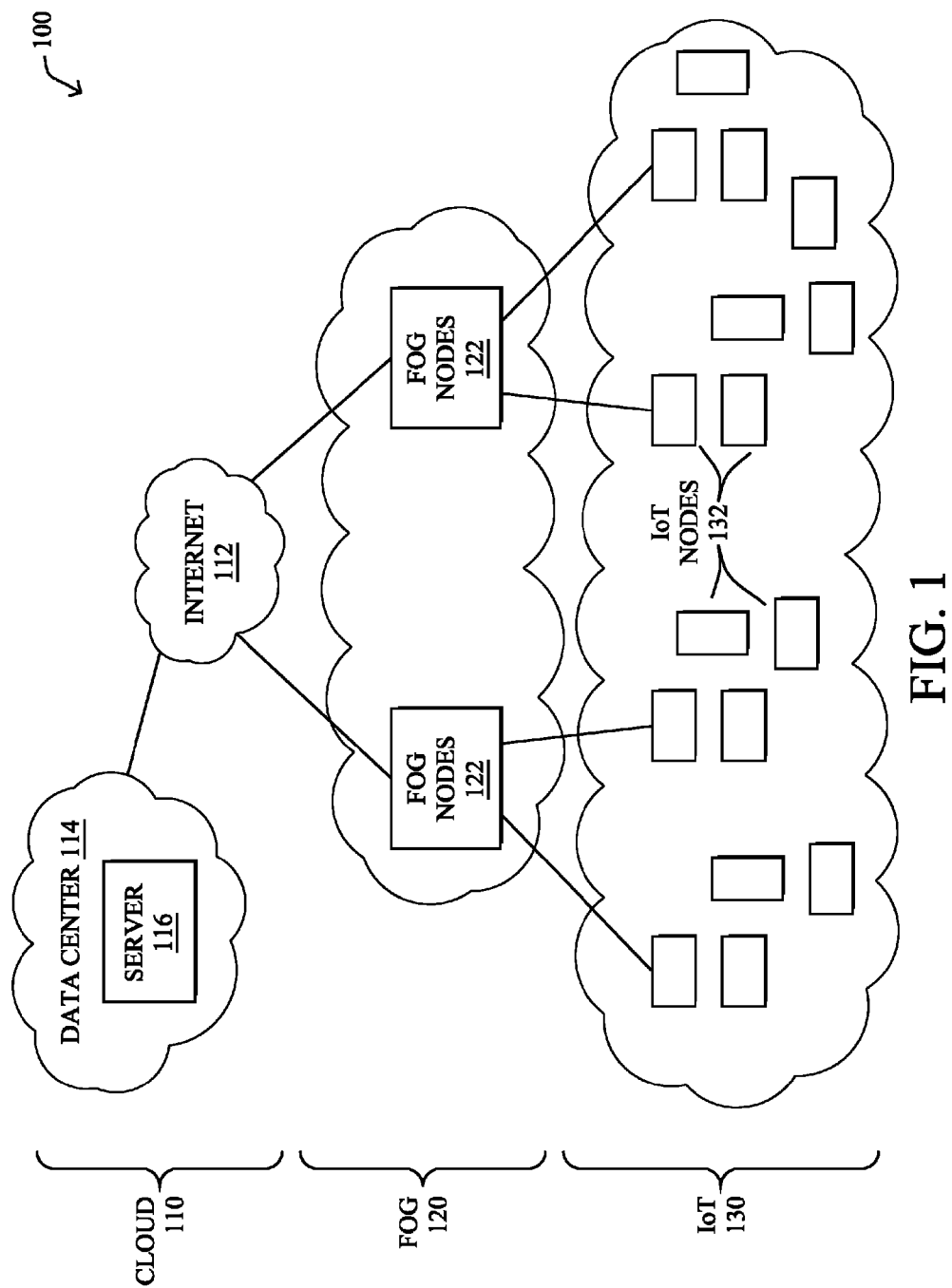
FIG. 1 illustrates an example computer network.

According to one or more embodiments of the disclosure, circuitry on a device is configured to detect a power failure of the device, inform a cellular modem of the device of the power failure, and supply capacitive reserve power to the cellular modem in response to the power failure. The cellular modem of the device may then send, using the capacitive reserve power, a cellular detach message into a cellular network, where the detach message has an indication that causes a receiving device to send a notification of the power failure to a configured endpoint device.

According to one or more additional embodiments of the disclosure, a device (e.g., cellular gateway) receives a cellular detach message from a neighboring device in a cellular network, and in response to detecting an indication within the detach message, may correspondingly send a notification of a power failure of the neighboring device to a configured endpoint device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
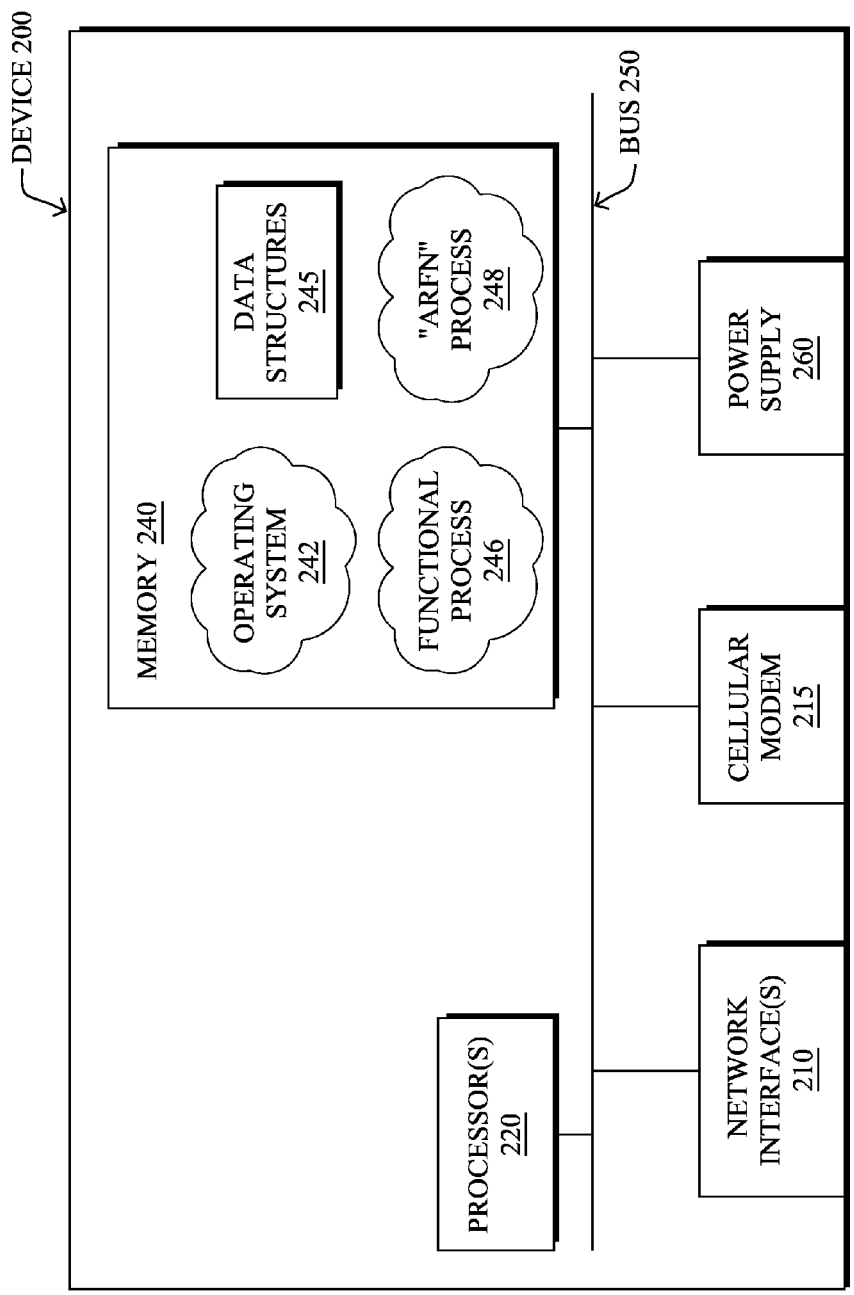
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, and in particular cellular interface 215, etc.), at least one processor 220, and a memory 240 interconnected by a system bus 250, as well as a power supply 260 (e.g., battery, plug-in, etc.).

The network interface(s) 210 and 215 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, WiFi transceivers, or the like, and cellular interface 215 may include cellular transceivers (e.g., a 4G LTE cellular modem), each to allow device 200 to communicate information to and from a remote computing device or server over an appropriate network. Note, further, that the nodes may have two different types of network connections 210, e.g., wireless and wired/physical connections, and that the view herein is merely for illustration. Also, while the network interface 210 is shown separately from power supply 260, for devices using powerline communication (PLC), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "ARFN" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Advance Remote Failure Notification (ARFN)—

As mentioned above, typical IoT deployments often have multiple routers deployed across a geographic area, where if the remote router goes down and does not reconnect, the reason for connectivity loss, though unknown, may simply be a power outage. Current techniques, particularly for cellular-based devices, address this problem by using capacitive power reserves to send a "dying message" over short messaging service (SMS) or email indicating the power failure. However, in current cellular deployments, the charge stored in a capacitor would either be insufficient (e.g., it can take up to nine seconds to send an SMS in 3G/2G cellular networks), or else would require a prohibitively large capacitor.

The techniques herein, therefore, do not send an SMS message using a capacitor-based charge, but instead provide an intelligent solution (ARFN) whereby a simple final message (with smaller capacitive power requirements) triggers a powered neighboring device to send a more detailed power outage notification (e.g., a full SMS/email). Said differently, by adding a specific value to a simple standard message (e.g., a "detach message"), rather than sending an SMS, this indicative value may then be interpreted by a powered neighboring device, which may then provide additional intelligence within a notification message to a desired endpoint (e.g., the NOC).

Specifically, according to one or more embodiments of the disclosure as described in detail below, circuitry on a device is configured to detect a power failure of the device, inform a cellular modem of the device of the power failure, and supply capacitive reserve power to the cellular modem in response to the power failure. The cellular modem of the device may then send, using the capacitive reserve power, a cellular detach message into a cellular network, where the detach message has an indication that causes a receiving device to send a notification of the power failure to a configured endpoint device.

Illustratively, the techniques described herein may be performed by hardware, software, and/or firmware, such as in accordance with the ARFN process 248, which may include computer executable instructions executed by the processor 220 to perform functions relating to the techniques described herein, e.g., in conjunction with corresponding processes of other devices in the computer network as described herein.

Operationally, the techniques herein illustratively relate to devices (e.g., routers) having cellular connectivity (e.g., as its WAN interface), such as 4G (4G LTE) networks, 3GPP networks, and so on. The advance remote failure notification (ARFN) described herein illustratively includes hardware circuitry as well as a newly defined cellular messaging exchange system.

Figure 3:
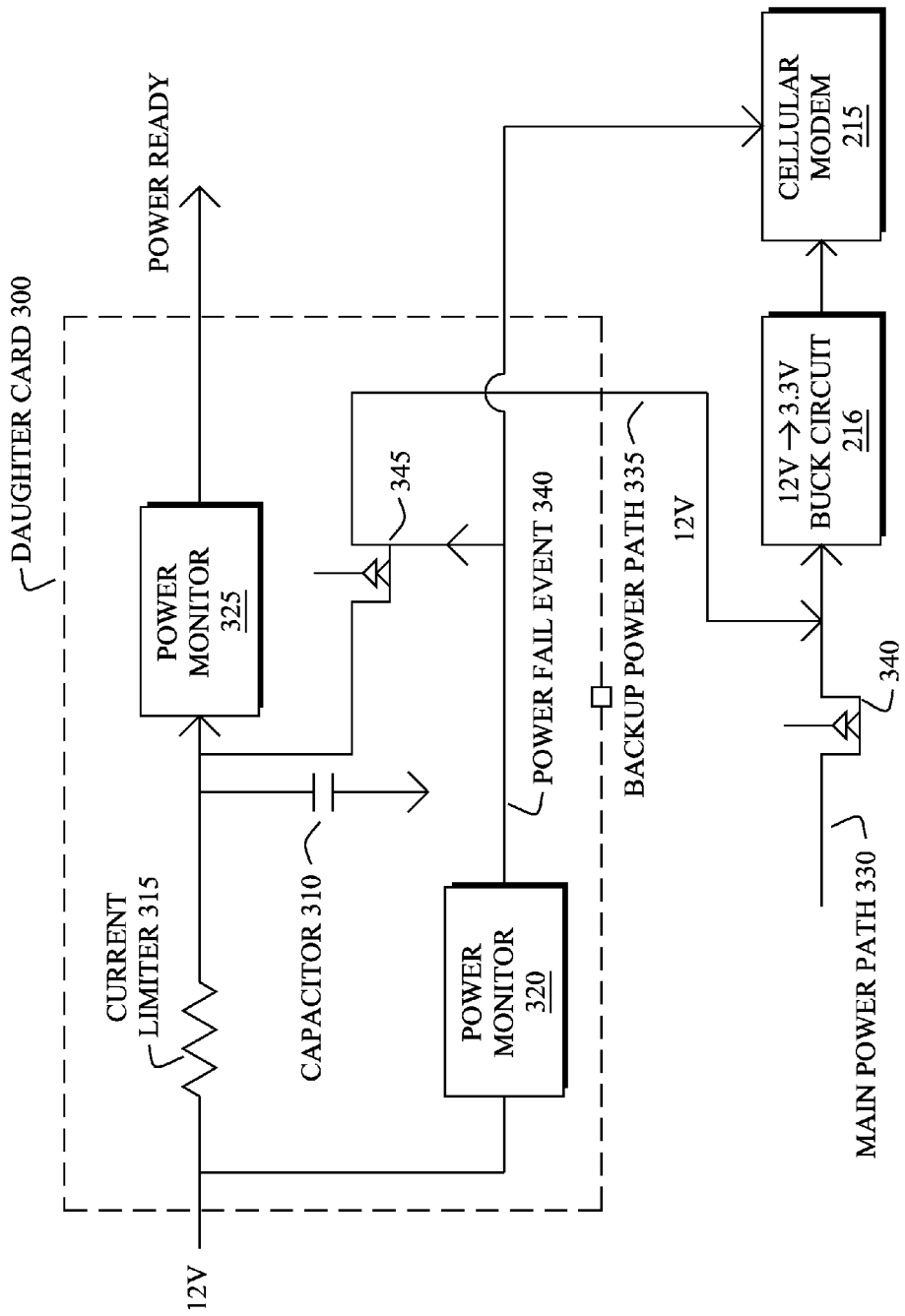
FIG. 3 illustrates an example circuitry for advance remote failure notification (ARFN)

With reference to FIG. 3, a hardware circuitry 300 (e.g., "daughter card") is shown with illustrative functional connections to cellular modem 215 (e.g., detailing an illustrative buck circuit 216). (Those skilled in the art will understand that other circuitry designs may be established with similar functionality, and that the view shown in FIG. 3 is merely an example design for illustration of the techniques herein.)

As shown in FIG. 3, the circuitry 300 may be connected to a mother board power supply (e.g., 260), with the other end of the daughter card being connected to the cellular modem 215. The circuitry 300 has capacitor (or other capacitive power reserve) 310 (e.g., via current limiter 315), which illustratively holds a charge for 200 ms-400 ms (e.g., 300 ms). If a power failure happens (to main power path 330), or more power monitors 320 and 325 detect it, assert a pin (power fail event 340) to inform the cellular modem 215 of the power failure, and supply the capacity charge (capacitive reserve power) over the backup power path 335 to the cellular modem (e.g., for the 300 ms), such as through a series of mechanical or electrical switches 340 and 345.

When the pin on cellular modem 215 is asserted, the modem illustratively sends, using the capacitive reserve power, a cellular detach message into the cellular network, as described below, where the detach message has an indication that causes a receiving device to send a notification of the power failure to a configured endpoint device.

Specifically, as mentioned above, it can take up to nine seconds for a modem to send an SMS on 2G and 3G cellular networks. In order for a capacitor to provide a charge for nine seconds, it would be prohibitively large and would require cooling and other mechanisms. To overcome this limitation, the techniques herein make use of a newly defined protocol configuration option (PCO) container in cellular attach and detach request messages.

Figure 4:
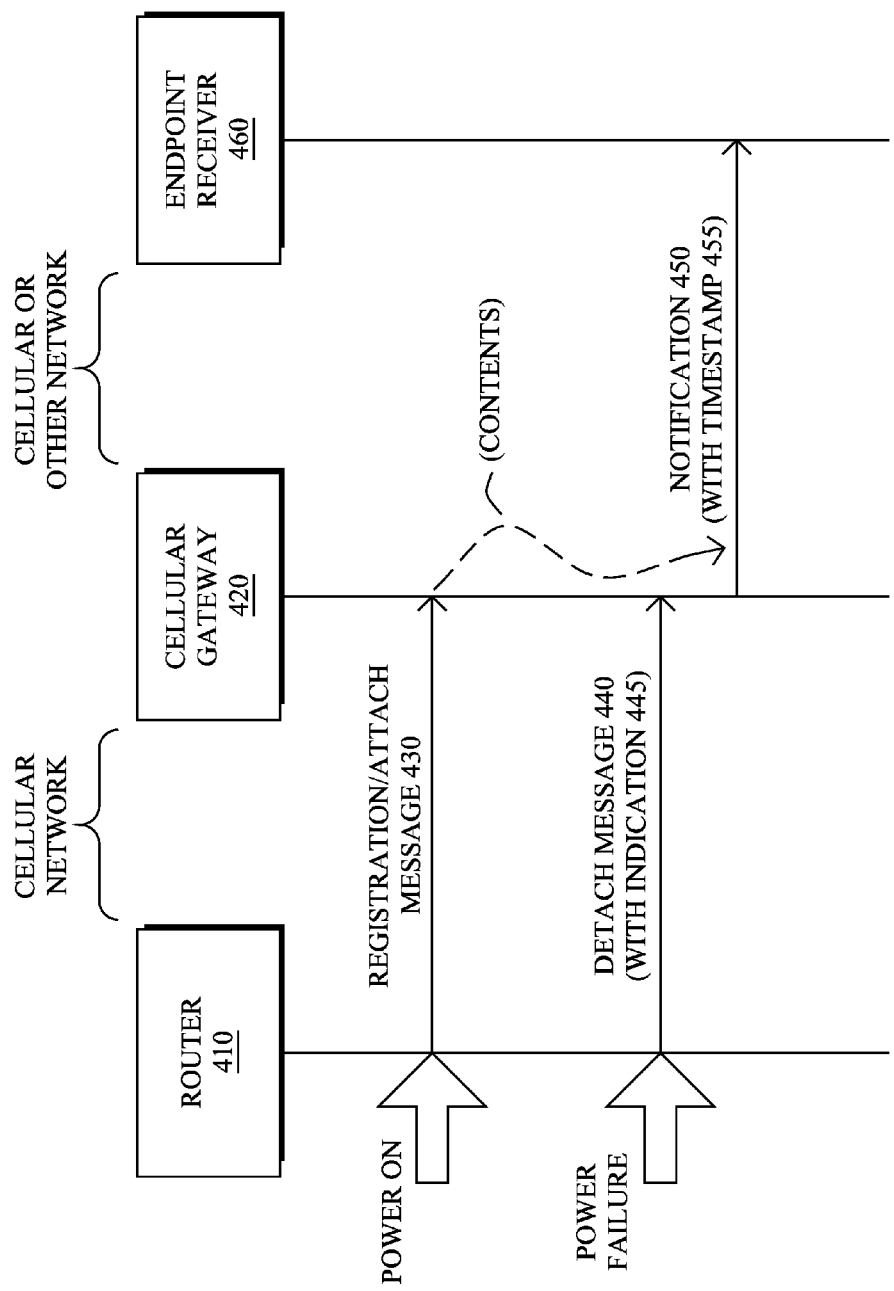
FIG. 4 illustrates an example message passage for ARFN.

FIG. 4 illustrates an example message exchange 400 in accordance with one or more embodiments of the techniques herein. In particular, when a router 410 is powered on, it connects to the cellular network and acquires cellular connectivity. Once connectivity is acquired, the ARFN process 248 registers the router with the network (e.g., a cellular gateway 420, illustratively a packet data network gateway or "PGW"), such as through a registration message (e.g., a cellular attach message) 430, and pushes notification contents such as device-ID (router-ID), site-ID, GPS-location, and so on. Illustratively, the registration may also indicate the particular endpoint receiver (e.g., servers, NOC, etc.) to which the notification should be sent. (Note that in one example, "0x8" may be used as the PCO option value.) The gateway (or other neighboring powered device) 420 stores the notification configuration (contents, etc.) for at least as long as the cellular connection/call is active.

Upon failure detection, the circuitry (daughter card) 300 informs the modem 215, which sends a detach message/request 440 with its last remaining capacitive power reserve. According to the techniques herein, the detach message 440 (e.g., a Delete PDP request or Delete session request, as may be appreciated by those skilled in the art) contains an indication (e.g., flag) 445 (e.g., an illustrative PCO value of "0x9") that the detach message is, in fact, an indication of a power failure of the device/router 410.

When the neighboring powered device, e.g., gateway 420 (such as a PGW) receives a detach request 440 (which illustratively contains the indication 445, such as a PCO set as 0x9), the powered device will look up previously stored notification contents. In one embodiment, the powered device/gateway 420 may add a timestamp 455 to the notification 450, and sends the notification 450 to an appropriate receiving endpoint 460 (e.g., in the form of an email or SMS), such as to a NOC.

Figure 5:
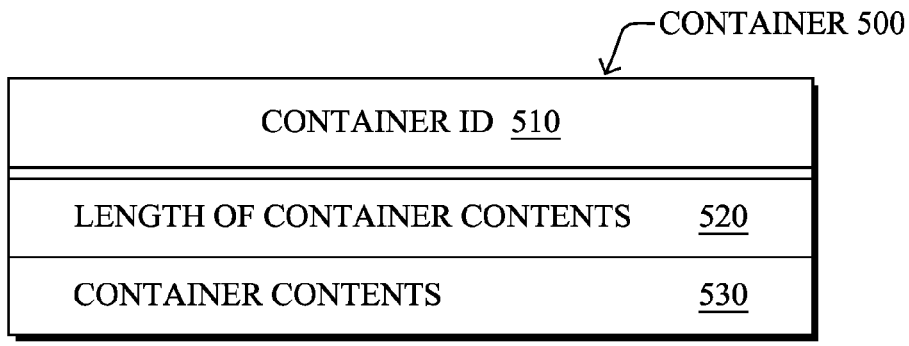
FIG. 5 illustrates an example container.
Figure 6:
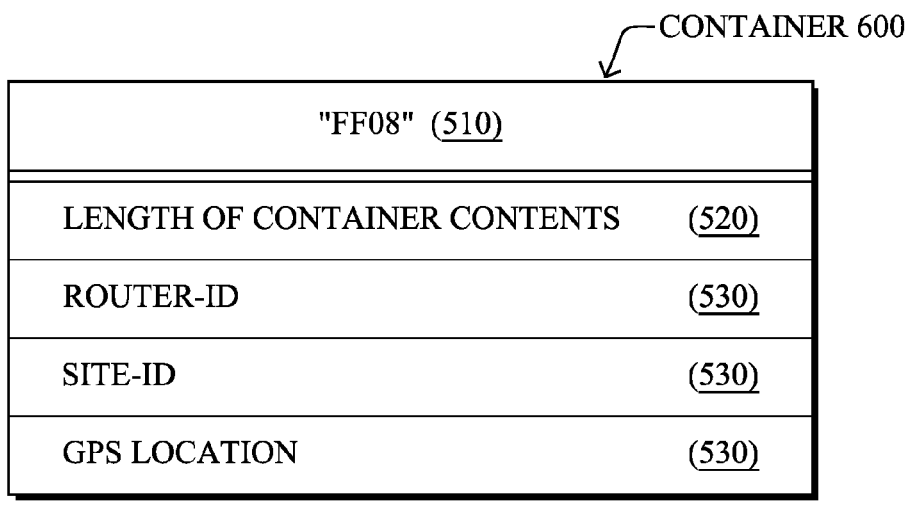
FIG. 6 illustrates an example attach message.
Figure 7:
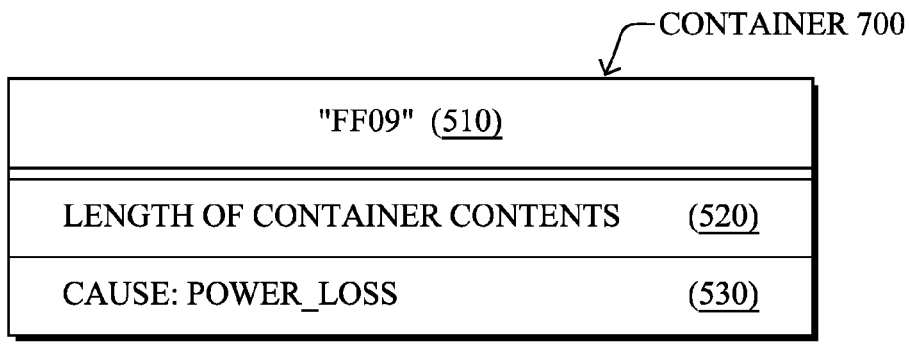
FIG. 7 illustrates an example detach message.

Illustratively, details of container formats are shown in FIGS. 5-7 that may be used with the techniques herein. Example container IDs "FF08" and "FF09" may be used for the attach message 430 and detach message 440, respectively. For instance, container 500 in FIG. 5 illustrates a simple illustrative container format, with a container ID 510, a container length 520, and container contents 530. In container 600 of FIG. 6, assume that the container ID is "FF08", thus indicating an attach message 430, where the contents 530 are illustratively filled with router-ID, site-ID, GPS-location, etc. Conversely, in container 700 of FIG. 7, assume that the container ID is "FF09", thus indicating a detach message 440, where the contents 530 may now be a simple indication of a power loss.

Figure 8:
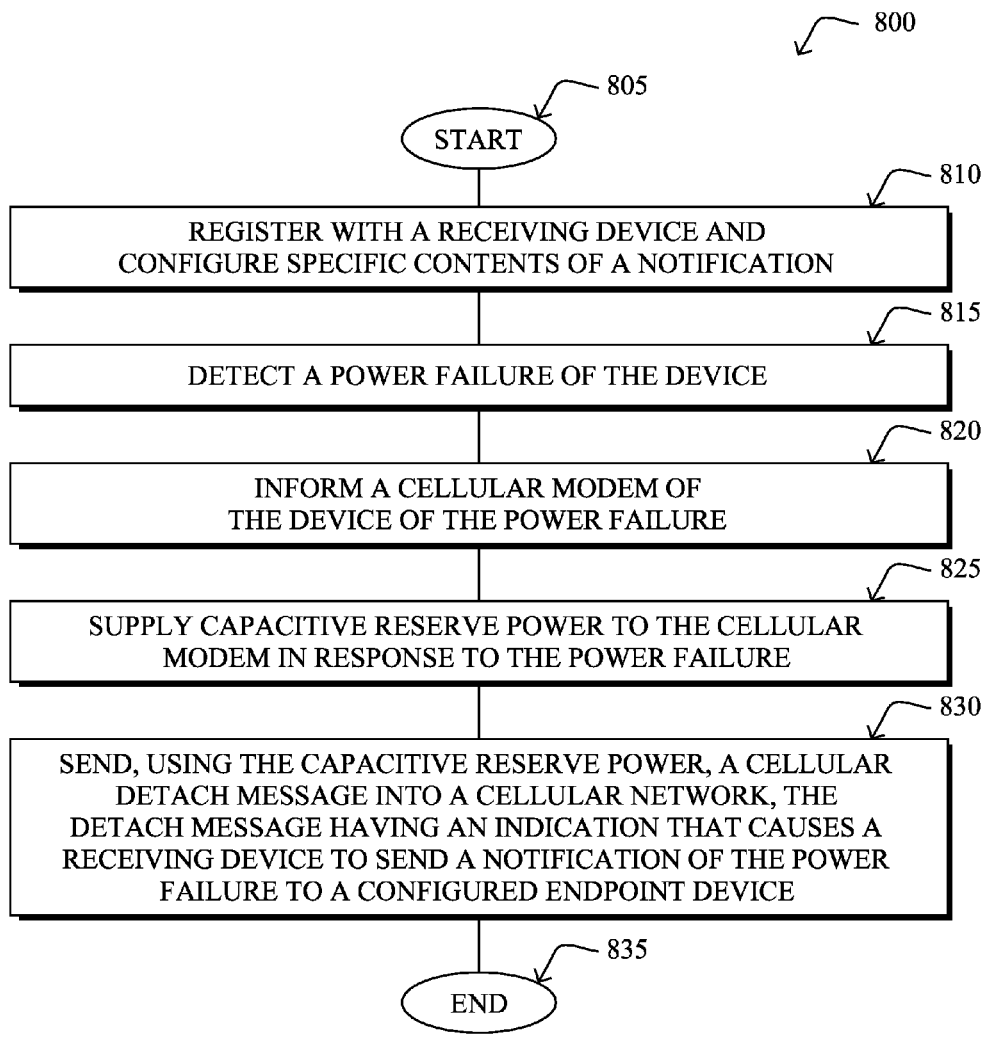
FIG. 8 illustrates an example procedure for ARFN, particularly from the perspective of a power-failing device.

FIG. 8 illustrates an example simplified procedure for advance remote failure notification (ARFN) in accordance with one or more embodiments described herein, particularly from the perspective of a power-failing device. For example, a non-generic, specifically configured device (e.g., device 200, illustratively as a router 410) may perform procedure 800 by executing stored instructions (e.g., process 248). The procedure 800 may start at step 805, and continues to step 810, where, as described in greater detail above, the device registers itself with a receiving device (e.g., gateway 420), such as through an attach message/request 430, and configuring, via the registering, one or more specific contents of a notification 450 (e.g., device ID, site ID, geographical location, and a specific endpoint device for the notification).

In response to circuitry 300 detecting a power failure of the device in step 815, then in step 820 it may inform a cellular modem 215 of the device of the power failure (such as by electronically asserting a pin on the cellular modem), and may supply capacitive reserve power to the cellular modem in step 825 (e.g., between 200 ms and 400 ms of power).

Accordingly, in step 830, the cellular modem sends, using the capacitive reserve power, a cellular detach message 430 into a cellular network, where the detach message has an indication 432 (e.g., a flag) that causes a receiving device (e.g., cellular gateway) 420 to send a notification 450 (e.g., SMS message or email) of the power failure to a configured endpoint device 460.

The illustrative simplified procedure 800 may then end in step 835, until the device 410 is once again powered on.

Figure 9:
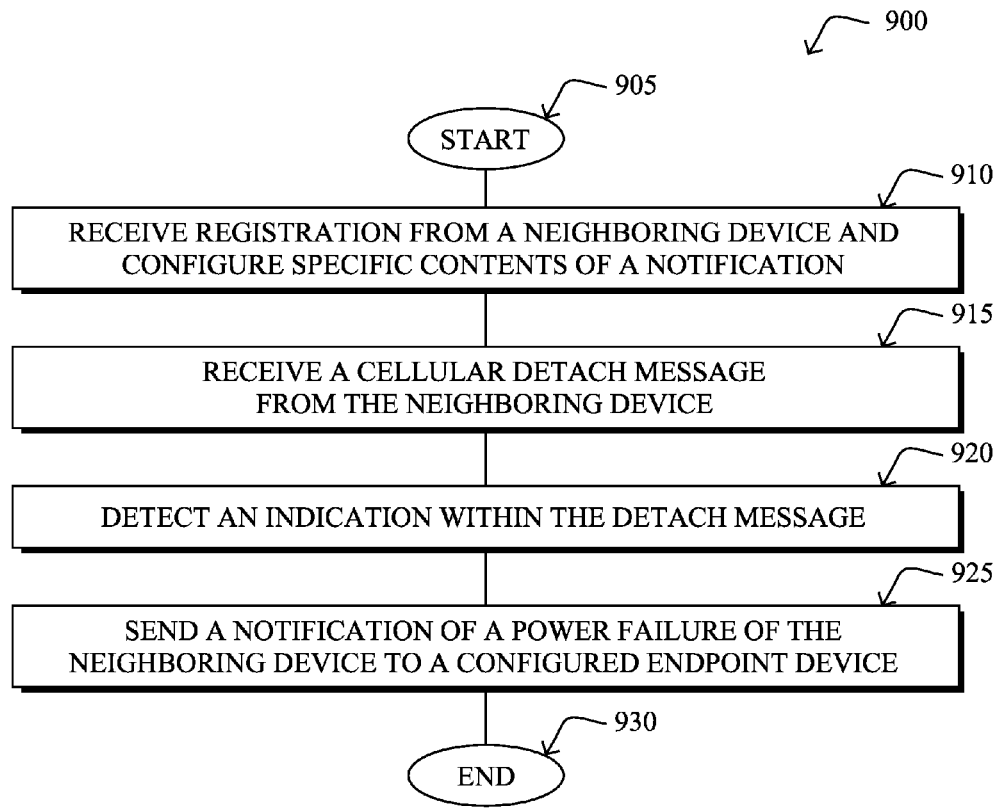
FIG. 9 illustrates an example procedure for ARFN, particularly from the perspective of a powered device.

Further, FIG. 9 illustrates an example simplified procedure for ARFN in accordance with one or more embodiments described herein, particularly from the perspective of a powered device (e.g., a gateway). For example, a non-generic, specifically configured device (e.g., device 200, illustratively as a cellular gateway 420) may perform procedure 900 by executing stored instructions (e.g., process 248). The procedure 900 may start at step 905, and continues to step 910, where, as described in greater detail above, the gateway receives a registration (prior to a power failure) from neighboring device 410 (e.g., router), and as described above configures specific contents of the notification 450. The gateway may then receive, in step 915, a cellular detach message 440 from the neighboring device 410.

In response to detecting an indication within the detach message, in step 920, the gateway 420 sends a notification 450 (e.g., email, SMS, etc.) of a power failure of the neighboring device 410 to a configured endpoint device 460. Note that the gateway may also append a timestamp to the notification, as mentioned above, as well as any other configured notification contents.

The simplified procedure 900 may then end in step 930, illustratively until the neighboring device is again powered on, and re-registers, accordingly.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for advance remote failure notification (ARFN), e.g., for power failure notification for cellular devices. In particular, the techniques herein allow for simple messages to be sent upon a power failure at a device, where a neighboring device (e.g., cellular gateway) that still has power can receive that message, and can then inform a relevant endpoint of the power outage condition. This can significantly reduce expenditures for truck rolls and administrator trouble shooting.

While there have been shown and described illustrative embodiments that provide for advance remote failure notification (ARFN), it is to be understood that various other adaptations and modifications may be made within the spirit and scope of the embodiments herein. For example, while certain embodiments are described herein with respect to "IoT" networks in particular, the techniques are not limited as such and may be used with computer networks, generally, in other embodiments. In addition, while certain devices are shown, such as routers, access points, gateways, etc., other suitable devices may be used, accordingly. That is, the embodiments have been shown and described herein with relation to specific network configurations (orientations, topologies, protocols, terminology, etc.), and particularly to cellular edge-based computing. However, the embodiments in their broader sense are not as limited, and may, in fact, be used with other types of networks and protocols, regardless of their nomenclature or underlying communication protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   detecting, by circuitry on a device, a power failure of the device;
   informing, by the circuitry, a cellular modem of the device of the power failure;
   supplying, by the circuitry, capacitive reserve power to the cellular modem in response to the power failure; and
   sending, by the cellular modem of the device using the capacitive reserve power, a cellular detach message into a cellular network, the detach message having an indication that causes a receiving device to send a notification of the power failure to a configured endpoint device.

2. The method as in claim 1, wherein the indication is a flag.

3. The method as in claim 1, wherein the receiving device is a cellular gateway.

4. The method as in claim 1, wherein the notification is selected from a group consisting of: an email; and a short message service (SMS) message.

5. The method as in claim 1, wherein the receiving device appends a timestamp to the notification.

6. The method as in claim 1, further comprising:
   registering, prior to the power failure, the device with the receiving device; and
   configuring, via the registering, one or more specific contents of the notification.

7. The method as in claim 6, wherein the one or more specific contents are selected from a group consisting of: a device identification (ID); a site ID; a geographical location; and a specific endpoint device for the notification.

8. The method as in claim 1, wherein informing comprises:
   electronically asserting a pin on the cellular modem.

9. The method as in claim 1, wherein the capacitive reserve power supplies between 200 ms and 400 ms of power to the cellular modem.

10. The method as in claim 1, wherein the cellular modem is a 4G modem.

11. An apparatus, comprising:
    a cellular modem; and
    circuitry configured to:
    a) detect a power failure of the apparatus,
    b) inform the cellular modem of the power failure, and
    c) supply capacitive reserve power to the cellular modem in response to the power failure;

wherein the cellular modem is configured to send, using the capacitive reserve power, a cellular detach message into a cellular network, the detach message having an indication that causes a receiving device to send a notification of the power failure to a configured endpoint device.

12. The apparatus as in claim 11, wherein circuitry is configured to inform by electronically asserting a pin on the cellular modem.

13. The apparatus as in claim 12, wherein the capacitive reserve power supplies between 200 ms and 400 ms of power to the cellular modem.

14. The apparatus as in claim 12, wherein the cellular modem is a 4G modem.

15. A method, comprising:
   receiving, by a device, a cellular detach message from a neighboring device in a cellular network;
   detecting, by the device, an indication within the detach message; and
   sending, by the device in response to the indication, a notification of a power failure of the neighboring device to a configured endpoint device.

16. The method as in claim 15, wherein the device is a cellular gateway.

17. The method as in claim 15, wherein the notification is selected from a group consisting of: an email; and a short message service (SMS) message.

18. The method as in claim 15, further comprising:
   appending a timestamp to the notification.

19. The method as in claim 15, further comprising:
   receiving registration, prior to the power failure, from the neighboring device; and
   configuring, due to the registering, one or more specific contents of the notification.

20. The method as in claim 19, wherein the one or more specific contents are selected from a group consisting of: a device identification (ID); a site ID; a geographical location; and a specific receiving device for the notification.

* * * * *